(12) United States Patent
Gardner et al.

(10) Patent No.: US 8,080,487 B2
(45) Date of Patent: *Dec. 20, 2011

(54) BALLISTIC FABRICS WITH IMPROVED ANTIBALLISTIC PROPERTIES

(75) Inventors: Slade H. Gardner, Fort Worth, TX (US); James R. Peoples, Fort Worth, TX (US); Brian T. Rosenberger, Aledo, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 1093 days.

This patent is subject to a terminal disclaimer.

(21) Appl. No.: 10/945,057

(22) Filed: Sep. 20, 2004

(65) Prior Publication Data

US 2006/0062944 A1    Mar. 23, 2006

(51) Int. Cl.
*D03D 15/00* (2006.01)
(52) U.S. Cl. ........ 442/189; 422/194; 422/239; 422/243; 422/301; 422/302; 977/742; 977/750; 977/752

(58) Field of Classification Search .................. 442/189, 442/194, 239, 243, 301, 302; 977/742, 750, 977/752
See application file for complete search history.

(56) References Cited

U.S. PATENT DOCUMENTS

| 6,265,466 | B1 * | 7/2001 | Glatkowski et al. | 523/137 |
| 2002/0113335 | A1 * | 8/2002 | Lobovsky et al. | 264/184 |

FOREIGN PATENT DOCUMENTS

GB    2 399 092 A    8/2004

* cited by examiner

*Primary Examiner* — Elizabeth M Cole
(74) *Attorney, Agent, or Firm* — Bracewell & Giuliani LLP

(57) ABSTRACT

The present invention provides fabrics that have unique mechanical, chemical, electrical, and thermal properties. The fabrics comprise layers of woven, knit or felted fibers, yarns or tow. Interstitially synthesized nanotubes, such as single-walled or multi-walled carbon nanotubes, enhance the fabric's antiballistic properties. These nanotubes may also insulate, semi-conduct or super-conduct electrical charges, or provide enhanced thermal properties of these fabrics which can be layered to form unique garments or structures.

26 Claims, 10 Drawing Sheets

BALLISTIC FABRICS WITH IMPROVED ANTIBALLISTIC PROPERTIES

RELATED APPLICATION

This application is related to U.S. Patent application entitled, "Anisotropic Carbon Alloy Having Aligned Carbon Nanotubes," application Ser. No. 10/944,964 which is hereby incorporated by reference in its entirety.

TECHNICAL FIELD OF THE INVENTION

The present invention generally relates to material structures that form fabrics. More particularly, this invention relates to fabrics having improved antiballistic properties from the synthesis of nanotubes within interstitial spaces within the fabric that transfer loads or stresses across the surface of the fabric.

BACKGROUND OF THE INVENTION

Weaving, knitting and felting of fibers, yarns and tow may produce fabrics. The fabric's properties depend on the properties of the fibers, yarn or tow and how they are joined together to form a fabric. Additionally, the physical properties of the fiber, yarn or tow greatly affect the fabric's properties. Illustratively, wool fibers are used to keep a person warm in the winter; asbestos fibers are used as a flame retardant; steel fibers are used for strength whereas gold fibers are used for conducting electricity.

Combining fibers, yarns or tow does not always result in a fabric that possesses a useful set of properties for a wide range of applications. For example, antiballistic fabrics, such as Kevlar, are sensitive to heat. Although adding flame retardant fibers of asbestos may provide limited support, Kevlar fabrics would not work optimally if exposed to continuous heat as well as to ballistic projectiles. Ideally, compatible fibers, yarns or tow having unique mechanical, thermal, electrical and optical properties would be woven, knitted or felted into fabrics that demonstrate all the desired properties within the fabric.

In addition to the limited range of applications, fabric quality depends on the ability to combine fabrics with one another. The material structure and size of the fibers and resulting yarns may inhibit the range of application of a certain fabric. Illustratively, fabrics that block entry of pathenogenic biological materials require that the consistent yarns be interwoven tightly to prevent any gaps between one another. The thickness of individual fibers alone could allow significant gaps within each yarn defined by those fibers. Generally, there does not exist a nanoscale fiber ($1\times10^{-9}$ meters) that provides significant strength and ductility so as to define a fabric. A need exists to improve certain properties (such as the antiballistic properties or thermal and electrical conductivity) of existing fabrics without degrading the fabric's original properties.

SUMMARY OF THE INVENTION

The present invention provides an improved antiballistic fabric that addresses the above identified need and other needs, as well, has at least one layer of fabric formed from fibers, yarns or tow. This fabric may be formed by weaving, knitting or felting these fibers, yarns or tow. Nanotubes, such as but not limited to carbon nanotubes, are synthesized within the interstitial spaces between the fibers, yarns or tow that form the fabric. These nanotubes become entangled and enhance the physical properties such as the antiballistic characteristics of the fabric. For example, the stiffness (modulus) of carbon nanotubes may transfer loads across the surface of the fabric. The nanotubes grow or are synthesized within the interstitial spaces between the fibers. This growth may be promoted by the use of transition metal catalysts such as iron, nickel, cobalt, molybdenum or yttrium deposited on the fabric or incorporated into the fibers prior to the forming of the fabric. These nanotubes may exhibit physical, electrical, mechanical, chemical or thermal properties which enhance those like properties of the fabric.

Another embodiment provides a garment made of enhanced fabric. This enhanced fabric is made from layer(s) of fabric made from fibers, yarns or tow. Carbon nanotubes, synthesized within the interstices between the fibers, become entangled with the fibers of the fabric and other nanotubes enhancing the physical properties of the fabric. For example, these carbon nanotubes may either electrically or thermally conduct to protect the user of the garment. For example, when the carbon nanotubes are superconducting nanotubes synthesized within the interstices between the fibers, these carbon nanotubes form a faraday cage in which the user of the garment is protected from electricity as any electricity would be conducted through the superconducting nanotubes. This electricity may then be shunted with a tether operable to short the electricity falling within the garment to ground. Similarly, carbon nanotubes having a high thermal conductivity that are synthesized within the fabric to form a thermal barrier between the occupant of the garment and the environment in which the garment is used. This thermal energy may be shunted through a tether operable to shunt thermal energy between the garment and either a heat sink or heat source. The entanglement of the nanotubes with the fabric and one another also improves the antiballistic properties of the fabric. For example, the matrix of a woven or knit antiballistic fabric is greatly strengthened as any mechanical stresses are distributed not only across the weave or knit but by the entangled nanotubes as well.

Yet another embodiment of the present invention provides a method to enhance the physical properties of the fabric. This involves forming at least one layer of fabric of fibers and synthesizing nanotubes within the interstitial spaces between fibers. These nanotubes become anchored and entangled with the fibers.

Carbon nanotubes consist of two-dimensional hexagonal sheets rolled together and often capped at both ends by a fullerene cap. Because of its tubular shape, a carbon nanotube extends outwardly to form a strand having a length many times greater than its diameter. Generally, the strands or "fibers" can be grouped together to define yarns. These yarns are then interwoven with one another and/or with companion yarns so as to define a fabric structure arrangement.

Carbon nanotubes are a type of fullerene that exhibit mechanical strength and stiffness characteristics greater than steel and other alloys but exhibit low-density characteristics similar to or below that of ceramic or polymer composites. As such, carbon nanotubes exhibit antiballistic characteristics with lower weight materials. Carbon nanotubes also exhibit electrical characteristics, dependent on their lattice structure. These characteristics include insulating, semiconducting, conducting, and superconducting properties, among others. Carbon nanotubes also demonstrate unique thermal characteristics.

Carbon nanotubes with differing characteristics can be woven, knitted or felted together to create unique fabrics. For example, carbon nanotubes that serve to electrically insulate can be combined or layered with highly electrically conductive carbon nanotubes to create garments that shield and protect the wearer from electric shock. Similarly, thermally conductive carbon nanotubes can be woven into materials that when tethered to a heat sink or source, serve to protect a user from intense thermal environments.

Other aspects, advantages, and novel features of the present invention will become apparent from the detailed description of the invention when considered in conjunction with the accompanying drawings.

BRIEF DESCRIPTION OF THE DRAWINGS

For a more complete understanding of the present invention and advantages thereof, reference is now made to the following description which is to be taken in conjunction with the accompanying drawings, and which like reference numerals indicate like features and, wherein:

FIG. 12A shows a vest; FIG. 12B shows one exemplary embodiment of a glove.

DETAILED DESCRIPTION OF THE INVENTION

Detailed embodiments of the present invention are disclosed herein. However, it is to be understood that the disclosed embodiments are merely exemplary of the invention, which may be embodied in various forms.

The present invention provides fabrics that exhibit unique mechanical, chemical, electrical, and thermal properties. The fabrics comprise layers of yarns (fibers) woven, knitted or felted together. Nanotubes, such as carbon nanotubes, couple to the fibers to provide these improved properties. The nanotubes may be single-walled carbon nanotubes (SWCNT) or multi-walled carbon nanotubes (MWCNT). The use of carbon nanotubes enhances the fabric's capability to absorb and disperse mechanical energy. Additionally, the carbon nanotubes may insulate, semi-conduct or superconduct electrical charges. The thermal properties of carbon nanotubes allow thermal energy to flow efficiently between the fabric and a heat sink or heat source. The fibers that make these fabrics may be materials such as Kevlar fibers, carbon nanotube fibers, natural fibers such as angora fibers, cashmere fibers, cotton fibers, hemp fibers, linen fibers, mohair fibers, plant fibers, ramie fibers, silk fibers, and wool fibers. The fibers may also be synthetic fibers such as blended fibers, acetate fibers, acrylic fibers, elastoester fibers, lyocell fibers, microfibers, nylon fibers, polyester fibers, polyolefin fibers, rayon fibers, spandex fibers, triacetate fibers, high-performance para-aramid fibers, ceramic fibers, glass fibers, aramid fibers, and Kevlar fibers. These fibers can be integrated or woven into the fabric to provide other unique properties for the fabric. These fabrics can be layered to form unique garments or other structures. The fabric may also be made of metal wires and their alloys as will be shown in actual micrographs of the interstitial nanotubes.

The interstitial nanotubes enhance the mechanical properties of the fabric by affecting how the fibers in the fabric pull apart. The interstitial nanotubes keep these fibers from spreading by absorbing a portion of the mechanical load through high stiffness elongation. Additionally these nanotubes may also be chemically activated with O2 and N2 functionalities that allow the nanotubes to filter, adsorb, associate or perform other chemical functions known to those skilled in the art.

Figure 1:
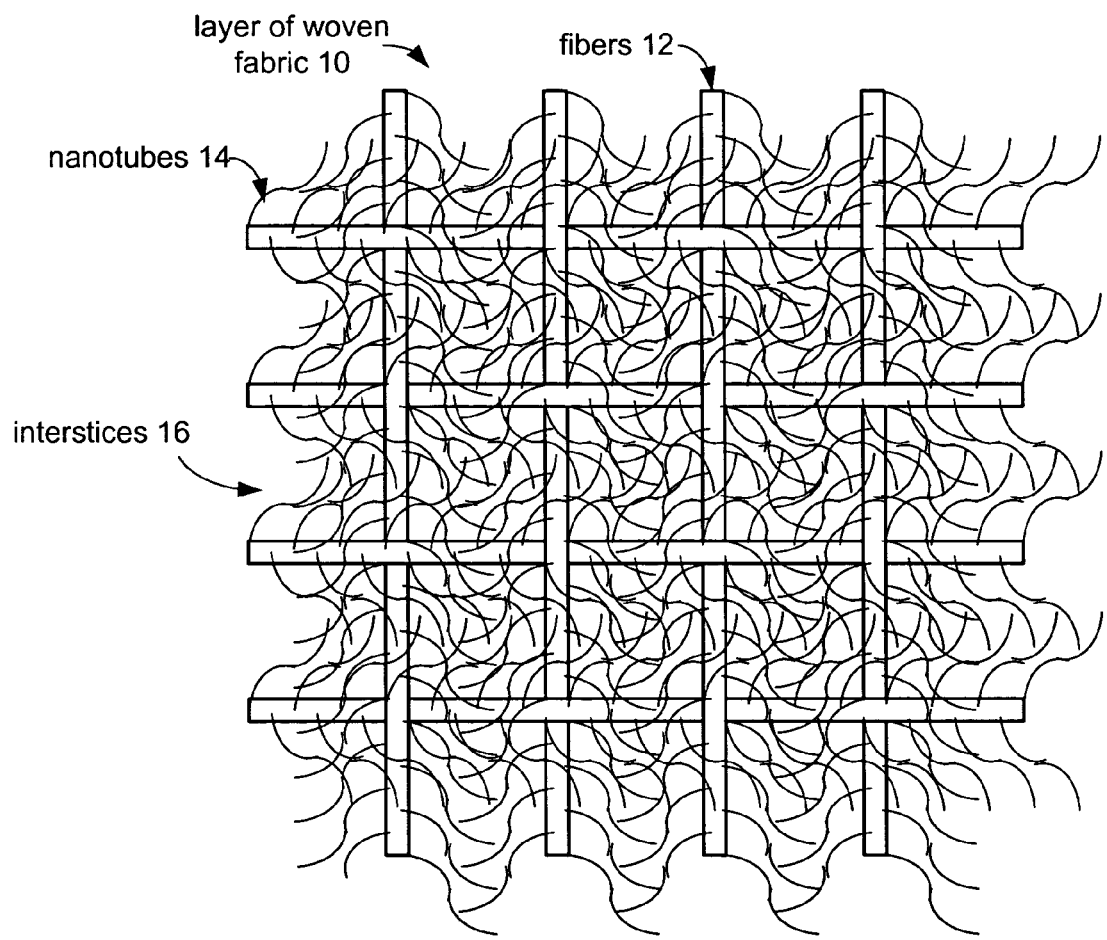
FIG. 1 illustrates a fabric of woven fibers with interstitial nanotubes in accordance with one embodiment of the present invention.
Figure 2:
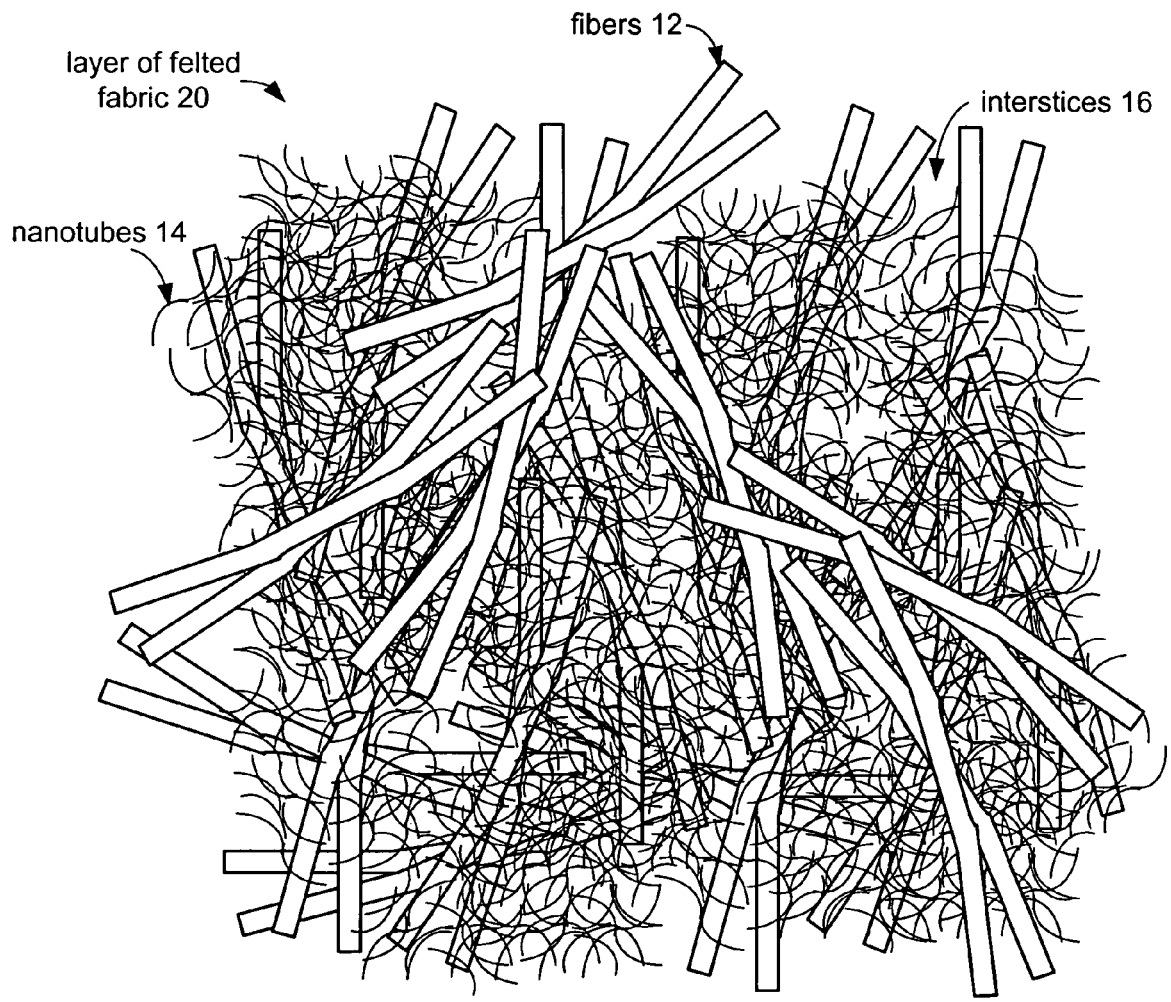
FIG. 2 illustrates a fabric of felted fibers with interstitial nanotubes in accordance with one embodiment of the present invention.
Figure 3:
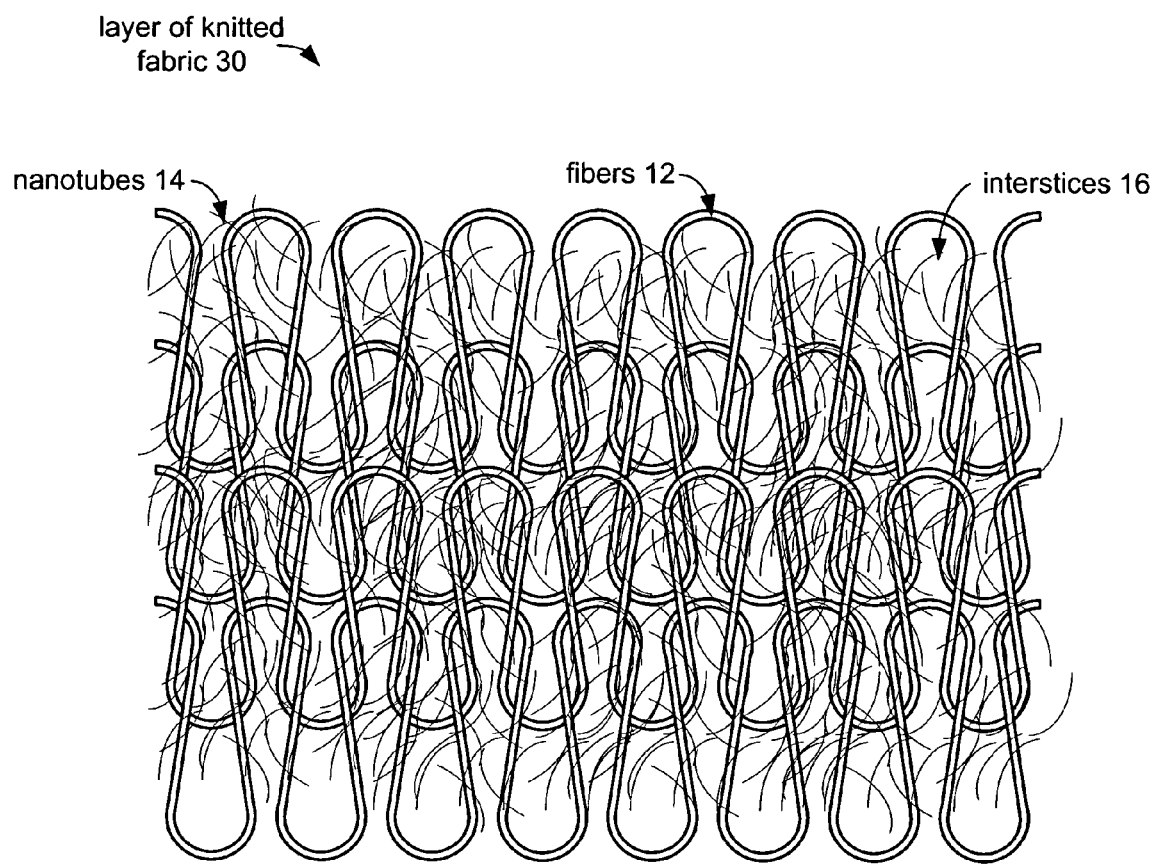
FIG. 3 illustrates a fabric of knit fibers with interstitial nanotubes in accordance with one embodiment of the present invention.

FIGS. 1, 2 and 3 depict individual layers of a fabric where the mechanical, electrical, thermal and chemical properties of the fabric may be improved by incorporating nanotubes within the interstices of the individual layer. FIG. 1 depicts a layer of woven fabric 10 wherein fibers 12 are woven to form a matrix. Nanotubes 14 are synthesized or grown within interstices 16 between fibers 12 to provide stiffness in their axial directions. The nanotubes may be anchored to individual fibers 12 and become entangled with other nanotubes and fibers in order to more uniformly distribute a ballistic impact within an antiballistic fabric. This entanglement allows the fabric to disperse or absorb the force and displace the pressure of an impacting object. The fibers distribute loads globally while the nanotubes distribute loads locally (nonsocial) to achieve a tiered mechanism with which to distribute mechanical loads. Fibers 12 and nanotubes 14 that engage an impacting object absorb the energy of the impact and disperse this energy to other fibers and nanotubes within the fabric. This transfer of energy occurs at "crossover points," where the fibers or nanotubes are entangled. Additional energy may be absorbed by the internal structure of the fibers and nanotubes or the presence of additional layers to further disperse the energy of the impacting object. This ensures that the mechanical stress experienced by a ballistic impact is distributed not only within the matrix of fibers 12 but also is distributed between the entangled nanotubes 14. The ability to absorb and distribute energy greatly increases the antiballistic properties of the fabric. It should be noted that one may also take advantage of other physical properties of the nanotubes 14 when carbon nanotubes are employed. Carbon nanotubes typically have unique thermal, electrical and mechanical properties which when incorporated into fabric 10 may allow the fabric itself to exhibit these properties.

Similarly, FIG. 2 depicts a layer of fabric 20 wherein fibers 12 are felted together to form the layer. As seen previously in the woven fabric of FIG. 1, nanotubes 14 are grown or synthesized within interstices 16 located between felted fibers 12. In this way, a felted fabric may exhibit the increased mechanical strength and antiballistic properties afforded by the entangled nanotubes 14.

FIG. 3 depicts a layer of knitted fabric 30. Here fibers 12 are knitted to form fabric. This allows a greater mechanical coupling of the fibers within the fabric to further improve the mechanical coupling of the fibers such that increased antiballistic properties are observed. Nanotubes 14 are grown within interstices 16 and may be anchored to fibers 12 with catalyst particles. In each of these cases the nanotubes may be grown by placing catalyst on or incorporating catalyst into the fiber surface. Carbon nanotubes may then be synthesized from where the catalyst is located using chemical vapor deposition or other known processes to grow these nanotubes.

Figure 4A:
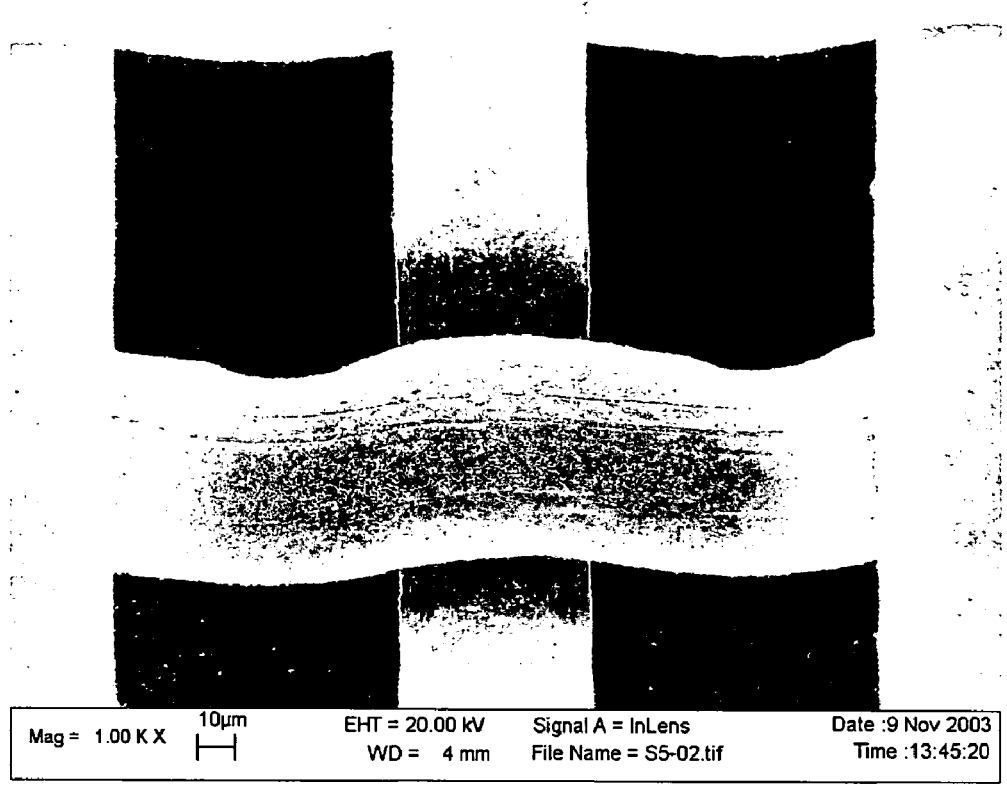
FIGS. 4A and 4B provide micrographs of a metal screen having interstitial carbon nanotubes.
Figure 4B:
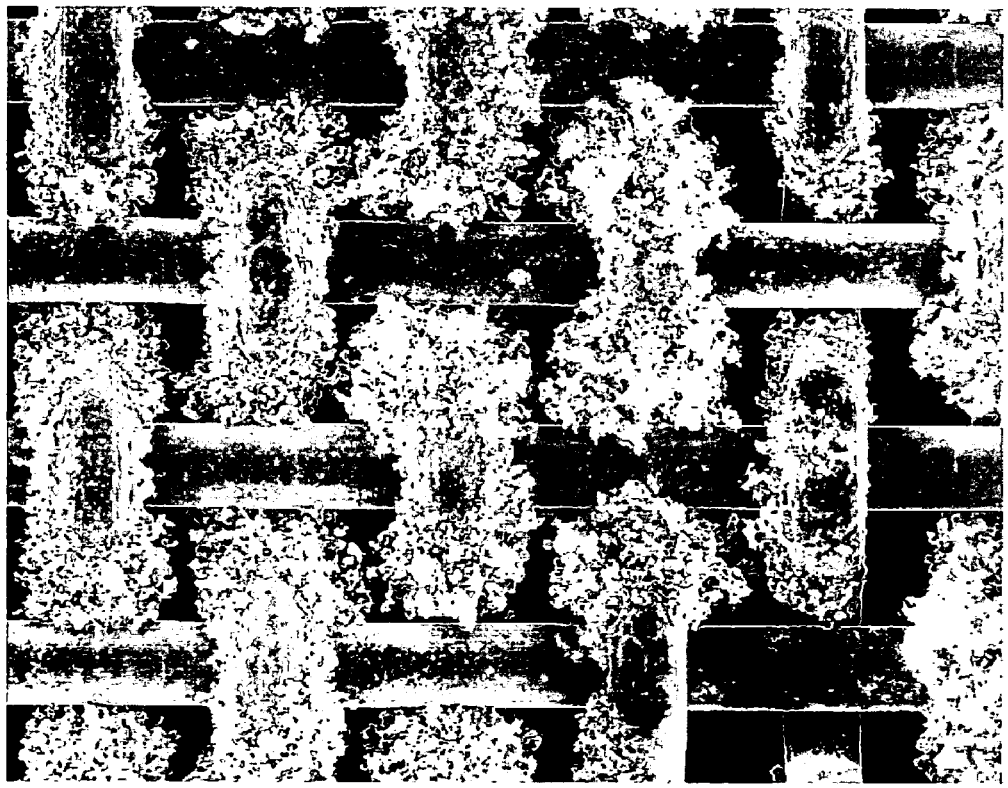

FIGS. 4A and 4B provide scanning electron micrographs of a metal mesh which has interstitial carbon nanotubes incorporated thereon. In FIG. 4A, the shape of the metal mesh or screen can be clearly seen. The interstitial carbon nanotubes are distributed along the surface of this screen. For a more tightly woven screen with longer growths of nanotubes, the nanotubes would be entangled to enhance load transfer features. FIG. 4B provides a view of a similar metal screen wherein the entanglement of the carbon nanotubes anchored to the fibers or wires of the metal screen may be more clearly seen. Here, the interstitial carbon nanotubes are anchored to the screen and become entangled with one another within the interstices of the metal screen. This entanglement allows mechanical forces to be distributed not only within the matrix of the screen, but to be distributed between the entangled interstitial nanotubes in order to provide improved observed physical properties of the fabric that incorporates interstitial carbon nanotubes.

In one embodiment the nanotubes primarily comprise single-walled carbon nanotubes (SWCNT), but may also include various other carbon allotropes such as but not limited to fullerenes and multi-walled carbon nanotubes (MWCNT). The SWCNTs may be present in different morphologies such as ropes, bundles, single filaments, and tangled webs. The SWCNT have large aspect ratios and weave throughout the fabric. On the nanometer scale, there are areas of local orientation where the SWCNT and MWCNT are aligned together. However, on a larger length scale, the nanotubes are isotropic in nature due to their random orientation. The carbon nanotubes may be formed by the deposition of carbon plasma with appropriate catalyst. The deposition can happen in a single step or a multi-step process. For example, plasma enhanced chemical vapor deposition (PECVD), chemical vapor deposition (CVD), physical vapor deposition (PVD), arc discharge, laser ablation and other like processes.

A single step process can make use of a suitable reactor with a single reactant stream using, for example, PVD, CVD, plasma reaction, sputtering techniques, particle spray, or plasma spray. A multi-step process can be used where a first layer is deposited on the fabric or fibers of FIGS. 1-3 using a suitable reactor to deposit a layer of one form of carbon, followed by deposition of a different layer using another suitable reactor. This multi-step process does not need to be limited to two different depositions, and can include a number of different layers and reactors. The multi-step process is repeated until the structure is complete. Many morphologies are possible with a range of properties attainable as a function of the composition of carbon allotropes and post-processing techniques. Post-processing can be done to enhance particular properties. Post-processing techniques may include, for example, Hot Isostatic Pressing (HIP), furnace heating, ion beam irradiation, electron beam irradiation, laser irradiation, electric resistive heating, inductive heating, or IR irradiation. Contaminants may be present in the nanotubes as a consequence of the process equipment, process feedstock, or catalysts used in the reactors. These contaminants are recognized as unavoidable and do not add to the structural performance of the alloy. Contaminants may be beneficial in that they fill areas or inclusions to occupy space that may otherwise become a void area. Contaminants may include, for example, oxides, metals, nitrides, nitrites, halides, organics, carboxyls, cyanides, or carbonyls.

In one embodiment, the carbon nanotubes are formed by a three-step process of carbon plasma generation, plasma stabilization, and product spray deposition, all of which are scalable to large, industrial volume production levels. The carbon plasma may be generated in several continuous manners, including electrical resistance heating, laser ablation of carbon, arc discharge, and/or electron beam vaporization of feedstock, and catalytic pyrolysis of organic precursors. In the second step, the plasma is stabilized, for example, with radio frequency energy from inductance coils. In the final step, a transition metal catalyst at the fibers and associated required catalyst support are used to form the end product.

One advantage and application of this specific embodiment is the continuous, large-scale production of single wall carbon nanotubes for producing fabrics with enhanced properties. This method provides for (1) the continuous generation of carbon plasma, (2) stabilization of the carbon plasma for homogenization of the reactant mixture and transport of a high concentration of carbon plasma to the product formation zone, and (3) a continuous operation, flow-through reactor design. In addition, the entire apparatus is designed so that it can be mounted vertically, such that continuous deposition of product can be precisely applied to fabrics using an overhead robotic arm or conveyor belt system.

Figure 5:
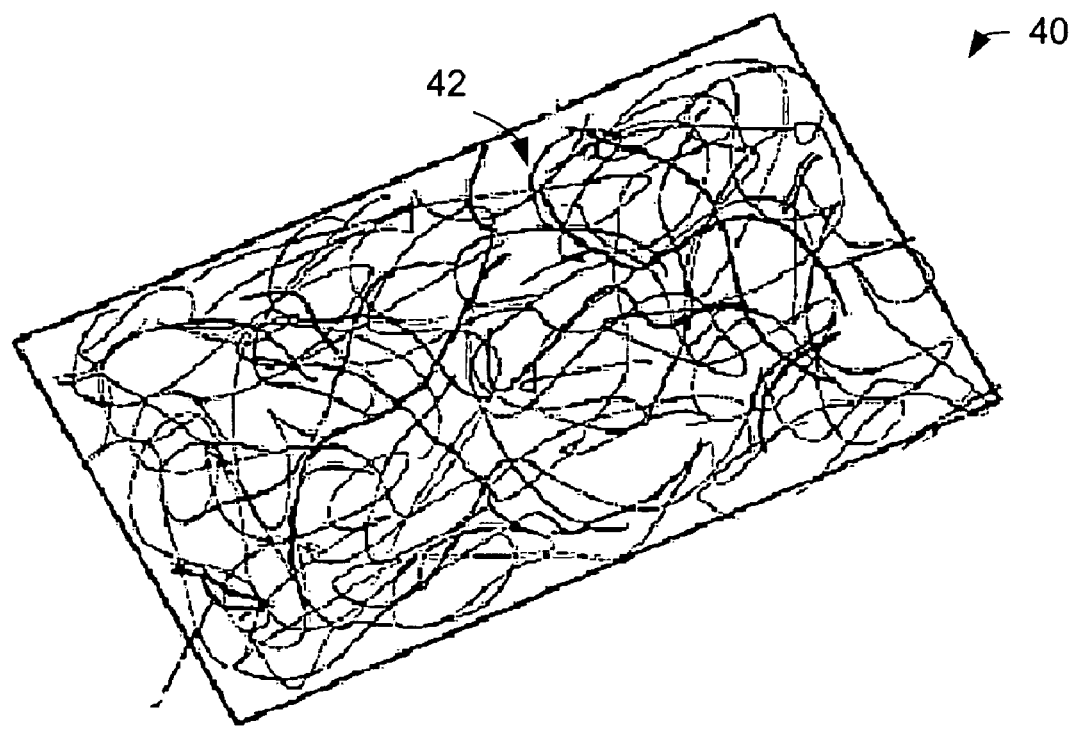
FIG. 5 is a schematic diagram illustrating a network of fibers comprising carbon nanotubes.

FIG. 5 illustrates a non-woven fabric 40 of yarns 42. Twisted fibers, such as those previously enumerated, may form yarns 42. These fibers, when incorporating carbon nanotubes, exhibit the unique electrical and mechanical properties of carbon nanotubes woven together along the nanotube's longitudinal axis. Long nanotubes can create macroscopic nanotube structures that maintain the unique properties of the nanotube. Although it remains difficult to infinitely increase the length of nanotubes by growth, an alternative method exists to obtain nanotube yarns of any desired length, which allow the properties of carbon nanotubes to be realized at a macroscopic level. One such method draws a continuous yarn of nanotubes from an array of nanotubes several hundred microns high on a silicon substrate.

Continuous yarns or fibers may be drawn from super-aligned arrays of parallel nanotubes held together by van der Waals forces. The yarns begin as thin ribbons a few hundred microns wide that contain parallel threads with diameters of several hundred nanometers.

When heat or electric current is applied to yarns formed from such fibers, increased conductivity and tensile strength has been observed. This indicates that some welding occurred at the connection points between the tubes. This may also be true when similar processes are applied to a fabric after interstitial nanotubes have been synthesized.

Returning to FIGS. 1-4B, fibers 12 may include both SWCNTs, MWCNTs and other fibers known to those skilled in the art. Fibers 12 and interstitial and nanotubes 14 may serve as electrical insulators, electrical or thermal conductors, or as highly conductive carbon nanotubes. In this disclosure and appended claims, the term "highly conducting" refers to the ability to conduct electricity with substantially superconducting characteristics.

Fibers 42 may further comprise yarns comprised of differing fibers. For example, fibers 12 may comprise polymers, glass, carbon, ceramic yarns, metallic wires and yarns having electrical properties such as semiconducting or highly conducting yarns. The compatible yarn may comprise a "blend" of such fibers.

FIG. 5 depicts a random mixture of CNT fibers 42 and other compatible yarns 44. For clarity, the entangled CNTs within the interstices are not shown. However, one should recognize that entangled nanotubes shown in FIGS. 1-4B may also be grown in the fabrics of FIG. 5 and following. These yarns of carbon nanotubes and at least one companion yarn may be woven, knitted or felted. Moreover, yarns 44 formed from carbon nanotube fibers may also include fibers from materials other than carbon nanotubes.

Fabric 40 may exhibit electrically insulating characteristics due to the random nature of yarns and interstitial CNTs. However, the random nature of yarns 44 may be employed against a wide range of impact angles from a ballistic element onto the fabric 40. For example, such cloth may be applied toward an antiballistic garment or vest.

Figure 6:
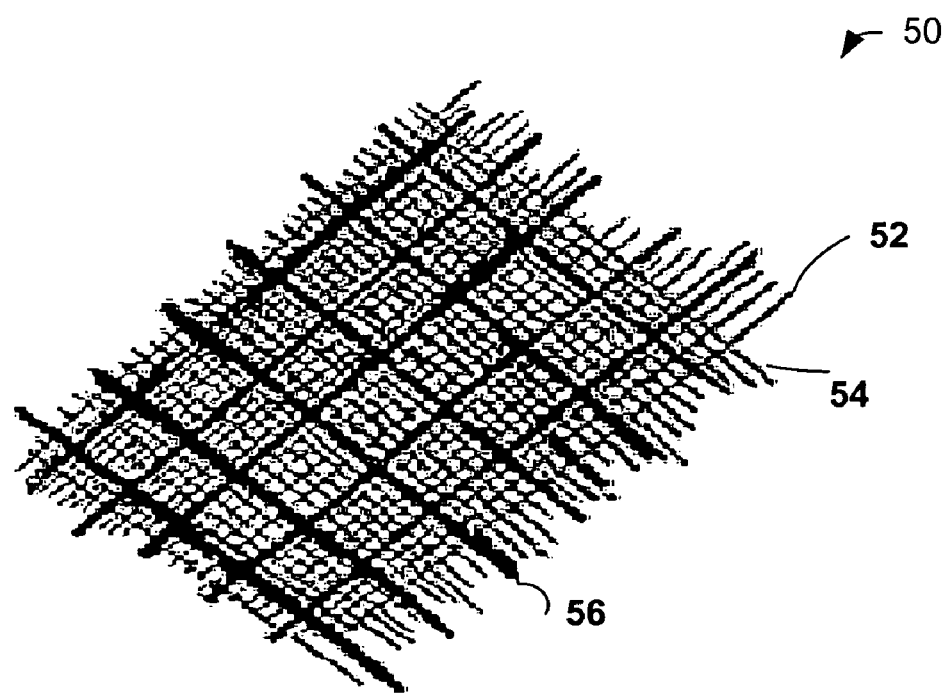
FIG. 6 provides a diagram illustrating another fabric woven from fibers comprising carbon nanotubes.

FIG. 6 depicts a woven fabric 50 comprising yarns 52 and 54. Yarns 52 and 54 include carbon nanotubes. In some embodiments, high strength yarns 56 function as rip stops. FIG. 5 depicts the fabric 50 before the growth of interstitial CNTs to enhance the fabric's physical properties. Compatible yarns may include polymers, glass, carbon, ceramic, metallic wire and yarns having electrical properties such as semiconducting or highly conducting yarns. The compatible yarn may comprise a "blend" of such fibers.

One of ordinary skill in the art will readily recognize that the yarns defined of carbon nanotubes and at least one companion yarn may be woven, knitted or felted. Moreover, the yarns formed from carbon nanotube fibers may also include fibers from materials other than carbon nanotubes.

Figure 7:
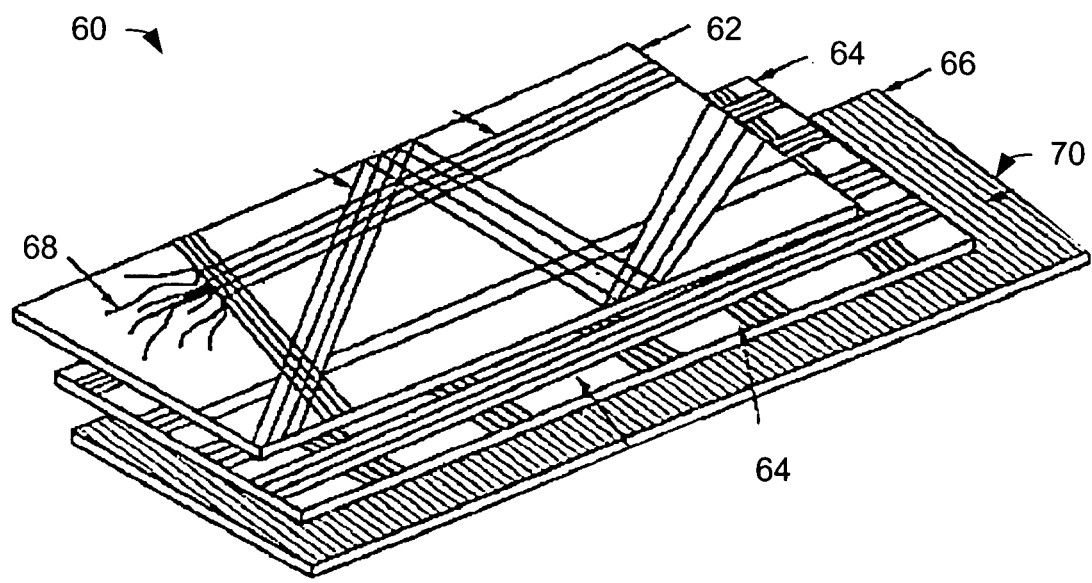
FIG. 7 illustrates layered fabric woven from fibers comprising carbon nanotubes with varying properties.

FIG. 7 depicts a multilayered fabric 60. Fabric 60 comprises a series of individual fabric layers 62, 64 and 66. These layers may include interstitial carbon nanotube fibers as shown in FIGS. 1-4B. As shown, yarn 68 includes distal ends extending from the layer 62. In operation, these tethered ends may provide for electrical or thermal contact between multilayered fabric 60 and an external ground or heat sink/source.

Layer 64 may comprise interwoven yarns 68. Here, these yarns are woven to form a grid pattern. This grid or mesh-like pattern of layer 64 is similar to that of FIG. 1. Layer 64 may act against impending ballistic elements. Alternatively, this fabric may in fact define woven electrical circuits.

Layer 70 includes an array of parallel yarns 72 positioned closely to one another. This array of tightly packed parallel yarns may define a physical nanoscale barrier against objects larger than or equal to $1 \times 10^{-9}$ meters. This nanoscale barrier may be further enhanced with interstitial nanotubes.

Layers 64 and 70 and their interstitial nanotubes may act cooperatively to filter material larger than or equal to $1 \times 10^{-9}$ meters. For example, layer 70 with the closely aligned parallel yarns provides a tear-resistant, anti-abrasion shield. One use of a multilayered fabric 60 may be to create lightweight garments impermeable to gas flow such as, for example, fabrics for spacesuits, chemical protective clothing, and biological protective clothing.

Figure 8:
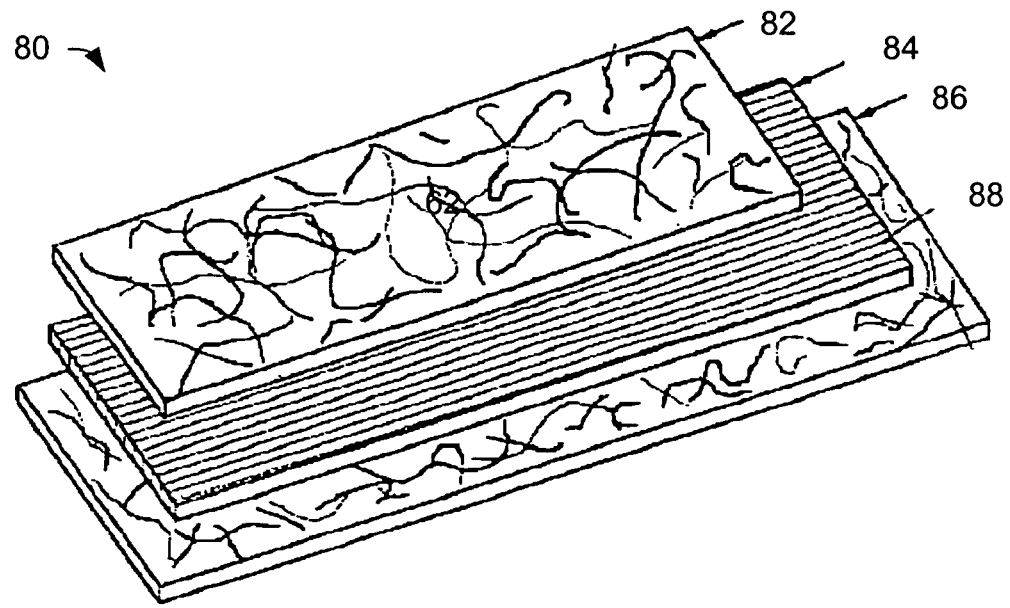
FIG. 8 provides another layered fabric structure having layers formed of fabric woven comprising carbon nanotubes.

FIG. 8 depicts multilayered fabric 80 which may incorporate interstitial nanotubes within the individual layers of fabric. Here, fabric 80 includes individual fabric layers 82, 84 and 86. As depicted, layers 82 and 86 appear to be felted layers as previously discussed in FIG. 2, and may include interstitial nanotubes. Layer 84 may exhibit electrically insulating characteristics. Layer 84 as depicted includes an array of fibers 88 arranged in parallel with one another. This structure may promote electrical or thermal conductivity therethrough. Similar to layer 82, layer 86 comprises randomly arranged felted yarns and entangled nanotubes to provide mechanical, electrical or thermal insulation. The incorporation of interstitial nanotubes within these fabrics may greatly enhance the physical properties of the fabric.

In one embodiment multilayered fabric 80 may be used to construct a Faraday cage that uniformly distributes charge about the outer surface while leaving an interior surface as a field free region. This charge may be distributed by the incorporation of interstitial nanotubes within the fabric. Layer 84 may provide a conductive or highly conductive layer insulated by layer 86, which prevents the wearer from contacting conducting layer 84. Additionally, inner layers of nanotube fabric, which may or may not include interstitial nanotubes, can be applied to provide the wearer additional comfort, such as lining for warmth or wicking material to draw moisture away from the wearer's skin.

A garment constructed from multilayer fabric 80 may be resistant to tearing due to the high mechanical strength and stain resistance provided by entangled interstitial carbon nanotubes, and lightweight (i.e., less bulky due to the size and strength provided by the carbon nanotubes).

Multilayered fabric 80 has many applications. For example, an electrical lineman may require lightweight protective clothing enhanced with carbon nanotubes to draw current away. An astronaut or a deep-sea diver may require fabric 80 to protect against abrasion, impacting ballasting elements, electromagnetic radiation, and/or thermal protection via reflection or conduction.

Figure 9A:
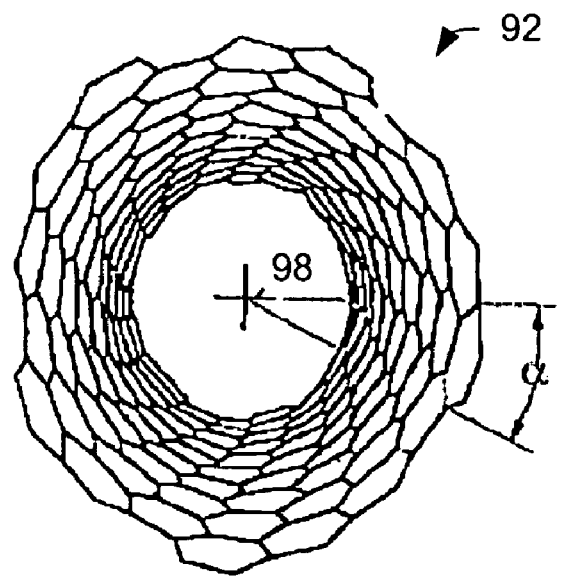
FIGS. 9A, 9B and 9C illustrate various lattice structures of single walled carbon nanotubes that demonstrate differing electrical properties.
Figure 9B:
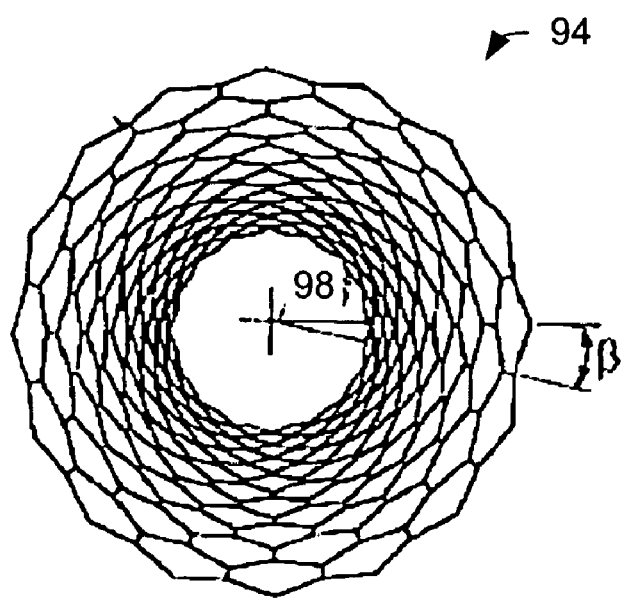
Figure 9C:
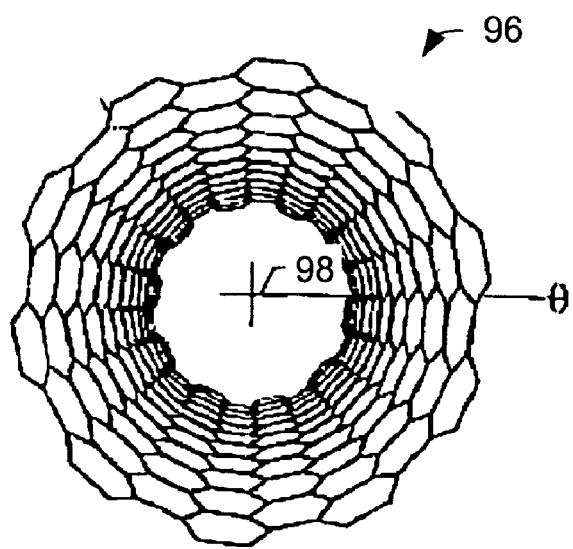

FIGS. 9A, 9B and 9C depict various lattice structures associated with SWCNTs used to form fibers and interstitial nanotubes. Each carbon nanotube 92, 94 and 96 has a symmetrical axis 98 extending longitudinally along the centerline of each single-walled carbon nanotube.

FIG. 9A depicts the lattice structure of an electrically insulating SWCNT. As such, applications of the present invention may include many insulating SWCNTs. Insulating lattice structure forms an angle alpha ($\alpha$) from symmetrical axis 98, wherein $\alpha$ is 30°. In this lattice structure, each insulating single walled carbon nanotube 91 inhibits the flow of electricity.

FIG. 9B illustrates the lattice structure of a semiconducting SWCNT 94. The lattice structure of each semiconducting SWCNT 94 is oriented at an angle beta ($\beta$) from symmetrical axis 98, wherein $\beta$ is greater than 0° but less than 30°. This allows structure 94 to form a chiral configuration. Here, each semiconducting SWCNT 94 inhibits that flow of electricity therethrough.

FIG. 9C depicts the lattice structure of a highly conductive SWCNT 96 that superconducts electricity. Lattice structure 96 aligns parallel to symmetrical axis 98. Varying the lattice structure of each SWCNT changes the ability to conduct electricity therethrough. Physical characteristics can be chosen depending on the application. For example, the yarns or fibers that make up the fabric may include any combination of insulating, semiconducting, and conducting SWCNTs. Furthermore, yarns may include nanotubes other than SWCNT, such as, for example, MWCNT having similar mechanical and electrical characteristics.

Figure 10:
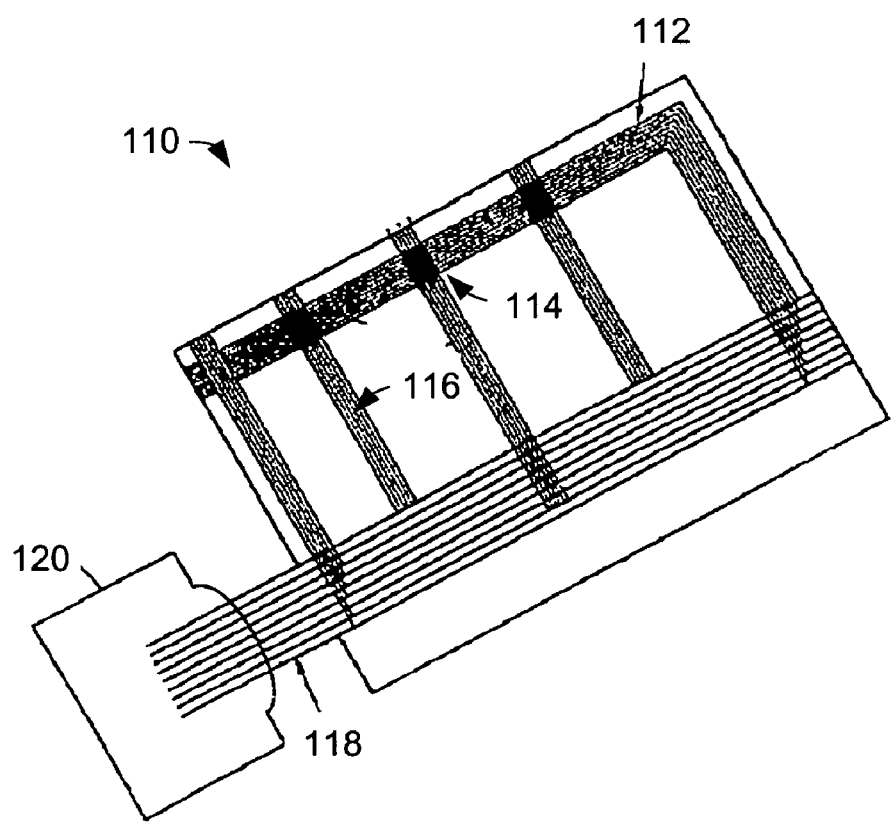
FIG. 10 illustrates a tethered piece of fabric.

FIG. 10 illustrates a tethered fabric 110 of woven fibers which may further contain interstitial carbon nanotubes. Weave 112 further comprises a first yarn 114 and a second yarn 116 positioned perpendicularly from the first yarn 114. Yarn 114 or yarn 116 may include fibers formed of CNTs. Fabric 110 couples to an umbilical or tether 118 extending from weave 112 to distal end 114. Tether 118 couples on the opposite end to base 116. Base 116 may serve as an electrical ground or thermal heat sink.

Tether 118 may couple to either the first or second yarns 114, 116 left unwoven and bundled into the umbilical. The umbilical or tether provides thermal as well as electrical grounding to provide protection from thermal or electrical hazards by connecting to a heat sink or by connecting to ground.

Weave 112 provides a path, which may be aided by interstitial nanotubes, to direct electricity toward and through the tether 118. Weave 112 may provide a highly conducting (low or no resistance) path for electricity and heat and thus no temperature gradient along tether 118 so long as energy is dissipated out through tether 118. Base 120 should have sufficient surface area and density to dissipate heat conducted throughout weave 112 to operatively provide a heat sink as well. Similar to the channeling of heat and/or electric energy through tether 118, those of ordinary skill in the art will readily recognize the channeling of other types of electromagnetic energy through tether 118 is possible as well. If the weave provides for continuous fiber direction, i.e., cross-fiber conduction to send energy from one end to another end of the fiber without loss and to thus dissipate energy through the umbilical. For example, energy within the range extending from the extra ultraviolet to the radio wave range.

Figure 11:
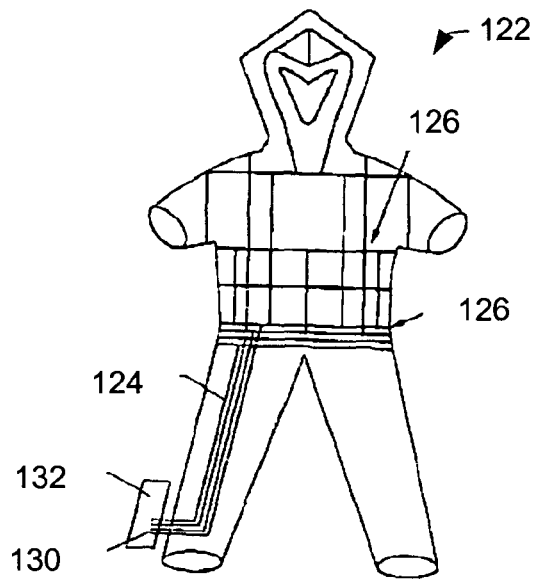
FIG. 11 depicts a full body tethered garment made of fabric woven from carbon nanotube fibers.

FIG. 11 depicts a garment 80 made from the previously described fabrics. Umbilical 124 allows energy exerted on garment 122 to be dissipated. Accordingly, the suit is made from fabric 128 that comprises interstitial carbon nanotubes.

Returning to FIG. 10, electrical energy may be applied to weave 112. Similarly, electrical energy is applied to garment 122 of FIG. 11. In both cases, this energy exits through the umbilical. Electromagnetic energy in FIG. 10 flows through weave 112 and umbilical 118. In the same manner, light energy may be directed through fabric 126 having highly conducting nanotube fibers so that the electromagnetic energy flows through distal end 130 via base 132.

Figures 12A, 12B:
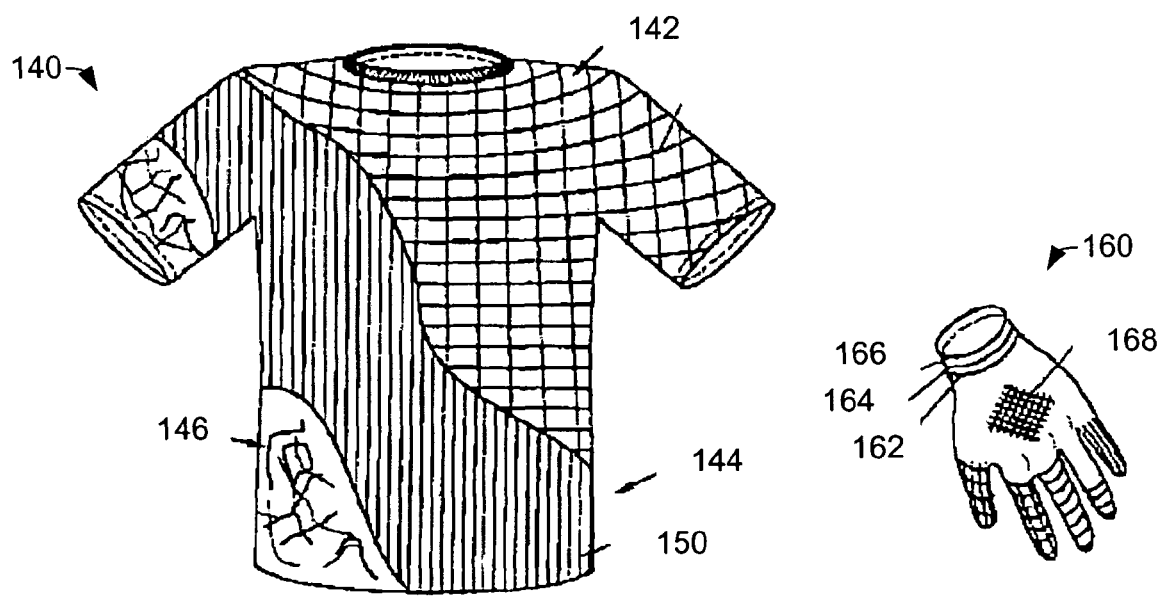
FIGS. 12A and 12B depict various garments made from fabrics woven from carbon nanotubes.
Figure 13:
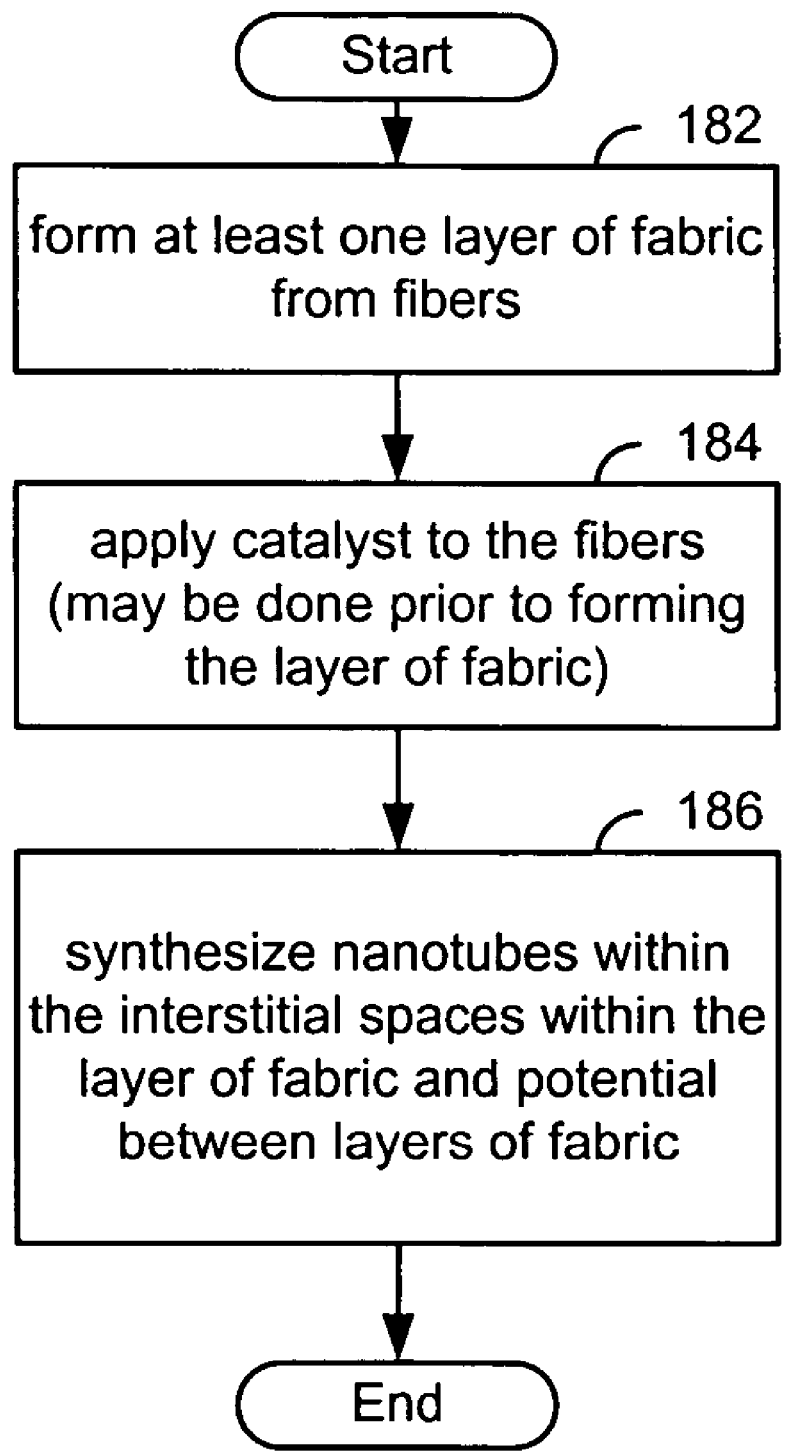
FIG. 13 is a logic flow diagram depicting formation of fabrics having enhanced properties in accordance with one embodiment of the present invention.

FIG. 12A depicts another garment that incorporates many unique properties of interstitial carbon nanotubes within its various layers. Garment 140 acts as a Faraday vest, or antiballistic vest having outer layer 142 over intermediate layer 144, and inner layer 146. Outer layer 142 comprises conductive yarns or antiballistic fibers woven in a mesh-like manner that incorporates interstitial carbon nanotubes within the interstices. The mesh-like configuration provides the wearer with flexibility and strength against tearing as well as resistance to impacting ballistic objects or projectiles. In addition to providing strength and flexibility, these fibers may electrically protect the wearer.

Intermediate layer 144 is positioned below the outer layer 142 and may in fact be operably coupled with outer layer 142 by interlayer interstitial carbon nanotubes. Intermediate layer 144 comprises yarns aligned or woven parallel with one another and/or coplanar with one another. Accordingly, yarns 150 operatively provide strength and ductility against tearing, impacting ballistic elements and/or abrasives. This may be enhanced by interstitial nanotubes. Moreover, yarns 150 and coupled interstitial nanotubes may further include highly conducting CNTs. Thus, yarns 150 may act to shunt energy associated with the electromagnetic spectrum, such as extreme ultraviolet, optical, or radio wave contact in addition to any electrical or magnetic contact.

Inner layer 146 lies beneath intermediate layer(s) 144. Inner layer 146 may also be coupled with intermediate layer(s) 144. Inner layer 146 insulates a wearer of garment 140 from being in direct contact with conducting layer 144. As shown, inner layer 146 comprises yarns randomly oriented within inner layer 146.

Inner layer 146 may further include compatible yarns such as fibers of cotton, wool, and/or other like fabrics as known to those skilled in the art to provide warmth and comfort to the wearer. In one embodiment, these yarns include wicking fibers that draw moisture away from the wearer or sound absorbing fibers that muffle or eliminate sounds generated by and/or received by the wearer. In another embodiment, yarns 116 provide a spring-like configuration so as to dampen or absorb shock forces exerted on the Faraday vest 140. As such, the network of yarns protects the wearer from forces applied thereto.

Electrically, a Faraday vest functions as a Faraday cage in which electromagnetic radiation does not penetrate the highly electrically conductive surface. Alternatively, garment 140 may act to conduct and direct current through an intermediate layer while still protecting the wearer via insulation. Moreover, the strength provided by the carbon nanotubes and fibers enables garment 140 to provide lightweight protection to the wearer from projectiles.

Colored yarns or fibers may be included in the fabric to enhance the fabric's appearance. For example, yarns may include colors suitable for camouflage, quick identification and/or reflection, and merchandising purposes.

FIG. 12B depicts a multilayered glove 160. Glove 160 includes an outer layer 162, at least one intermediate layer 164, and an inner layer 166. Glove 160 forms a Faraday cage having at least one intermediate layer that electrically insulates the wearer. In another embodiment, glove 160 comprises layers highly resistant to tear or abrasion. One such use would be for a surgical glove that resists accidental cuts and acts as a biological barrier to bacteria or viruses.

Glove 160 may comprise layers of interstitial carbon nanotubes and fibers integrated with one another. For example, outer layer 162 may include a palm portion comprising electrical circuits 188 wherein the circuitry includes memory and/or sensory devices or other like devices as known to those skilled in the art.

Outer layer 162 includes several fabrics that define the finger portions of a glove. The thumb and index finger may include a meshlike fabric having tightly interwoven yarns. As such, the thumb and index finger may provide enhanced strength and resistance to wear, among other aspects. Additionally, the finger portions of glove 162 may define memory and/or sensory circuits. Other garments such as stockings, coats, shirts, suits, and/or hats may take advantage of the properties offered by the various layers of such fabric. For example, protective gear such as motorcycle racing leathers could be replaced with the fabrics that protect the wearer from abrasion. More specifically, in the instance of motorcycle protective garments, the wearer can be protected from abrasive injury or "road rash".

FIG. 12 provides a logic diagram depicting a method utilizing the present invention to enhance the physical properties of fabric. Beginning with step 182, fibers are used to form individual layers of fabric. In step 184, this fabric is coated with catalyst to enhance the synthesis of nanotubes. Alternatively, catalyst may coat the fibers prior to forming the fabric. Step 186 synthesizes nanotubes, such as carbon nanotubes, within the interstices between the fibers. These interstices may be within a single layer of fabric or the interstitial space between layers of fabric. This allows the nanotubes to greatly increase the anti-ballistic or mechanical properties of the fabric by entangling the synthesized nanotubes with other synthesized nanotubes and fibers within the interstitial space between fibers both from the same layer of fabric and other layers of fabric.

In summary, the present invention provides fabrics that have enhanced physical properties. The fabrics comprise layers of fibers and interstitial nanotubes. These nanotubes may be either SWCNTs or MWCNTs. The use of entangled carbon nanotube fibers allows the fabrics to dissipate kinetic energy, insulate, semi-conduct or super-conduct electrical charges. Additionally, the thermal properties of carbon nanotubes allow thermal energy to flow efficiently between the fabric and a heat sink or source. Additional yarns of materials can be integrated into the fabric to provide other unique properties for the fabric. These fabrics can be layered to form unique garments or structures.

Although the present invention has been described in detail, it should be understood that various changes, substitutions, and alterations can be made hereto without disporting from the spirit and scope of the invention as defined by the appended claims.

What is claimed is:

1. An antiballistic fabric comprising:
   at least one layer of fabric, wherein at least one layer of fabric comprises
      fibers, yarns or tow; and
      nanotubes synthesized within interstices between the fibers of at least one layer of fabric and that are entangled with and anchored to the fibers,
   wherein the nanotubes enhance the antiballistic properties of at least one layer of fabric and wherein the nanotubes synthesized within interstices between fibers form a Faraday cage.

2. The antiballistic fabric of claim 1, wherein where the fibers and nanotubes are entangled comprise crossover points that provide a means for transferring a load between the entangled fibers and nanotubes.

3. The antiballistic fabric of claim 1, wherein the nanotubes and the fibers are connected globally throughout the fabric by the entanglement between the nanotubes and the fibers so that when a load is applied to the fabric, the globally connected fibers and nanotubes contain a dispersed portion of the load.

4. The antiballistic fabric of claim 3, wherein the fibers, yarns or tow comprise at least one type of fiber selected from the group consisting of: angora fibers; cashmere fibers; cotton fibers; hemp fibers; linen fibers; mohair fibers; plant fibers; ramie fibers; silk fibers; wool fibers; blended fibers; acetate fibers; acrylic fibers; elastoester fibers; lyocell fibers; microfibers; nylon fibers; polyester fibers; polyolefin fibers; rayon fibers; spandex fibers; triacetate fibers; high-performance para-aramid fibers; ceramic fibers; glass fibers; carbon fibers; graphite fibers; aramid fibers; and metal fibers.

5. The antiballistic fabric of claim 4, wherein catalysts at the surface of the fiber induce nanotube synthesis at the catalysts.

6. The antiballistic fabric of claim 5, wherein the synthesized nanotubes comprise carbon nanotubes.

7. The antiballistic fabric of claim 6, wherein the catalyst is incorporated into the fibers used to produce the antiballistic fabric.

8. The antiballistic fabric of claim 6, wherein the fabric exhibits the physical, electrical, mechanical, chemical or thermal properties of the carbon nanotubes located within the interstices between the fibers.

9. The antiballistic fabric of claim 6, wherein the carbon nanotubes comprise single-walled carbon nanotubes and/or multi-walled carbon nanotubes.

10. The antiballistic fabric of claim 9, wherein said carbon nanotubes comprise insulating, semiconducting, conducting and/or superconductive carbon nanotubes.

11. The antiballistic fabric of claim 1, further comprising: at least one additional layer of fabric, wherein at least one layer of fabric comprises fibers; and nanotubes synthesized within interstices between the fibers within at least one additional layer of fabric, and instances between the fibers of at least one layer of fabric and at least one additional layer of fabric, wherein the nanotubes enhance the physical properties of the antiballistic fabric.

12. A garment made of antiballistic fabric, wherein the antiballistic fabric comprises: at least one layer of fabric, wherein the at least one layer of fabric comprises fibers; and carbon nanotubes synthesized within interstices and entangled with the fibers of the at least one layer of fabric, wherein the entangled carbon nanotubes and fibers are anchored together and comprise a means for distributing a mechanical load throughout the fabric and wherein superconductive carbon nanotubes synthesized within interstices between fibers form a Faraday cage.

13. The garment of claim 12, wherein the carbon nanotubes comprise insulating, semiconducting, conducting and/or superconductive fibers.

14. The garment of claim 12, further comprising an electrical tether operable to shunt electricity flowing within the garment to ground.

15. The garment of claim 12, wherein carbon nanotubes having a high thermal conductivity and synthesized within interstices between fibers, form a thermal barrier between an occupant of the garment and a thermal environment in which the garment is located.

16. The garment of claim 15, further comprising a thermal tether operable to shunt thermal energy between the garment and a heat-sink or heat-source.

17. The garment of claim 12, wherein the at least one layer of fabric is formed by weaving, knitting or felting the fibers, yarns or tow.

18. The garment of claim 12, wherein the fibers comprise at least one type of fiber selected from the group consisting of: natural fibers, angora fibers; cashmere fibers; cotton fibers; hemp fibers; linen fibers; mohair fibers; plant fibers; ramie fibers; silk fibers; and wool fibers; synthetic fibers, blended fibers; acetate fibers; acrylic fibers; elastoester fibers; lyocell fibers; microfibers; nylon fibers; polyester fibers; polyolefin fibers; rayon fibers; spandex fibers; triacetate fibers; high-performance para-aramid fibers; ceramic fibers; glass fibers; carbon fibers; graphite fibers; and aramid fibers.

19. The garment of claim 12, wherein catalysts at the surface of the fiber induce nanotube synthesis at the catalysts.

20. The garment of claim 12, wherein the fabric exhibits the physical, electrical, mechanical, chemical or thermal properties of the carbon nanotubes.

21. The garment of claim 12, wherein the antiballistic fabric further comprises: at least one additional layer of fabric, wherein the at least one layer of fabric comprises fibers; and nanotubes synthesized within interstices between the fibers within the at least one additional layer of fabric, and interstices between the fibers of the at least one layer of fabric and the at least one additional layer of fabric, wherein the nanotubes enhance the physical properties of the antiballistic fabric.

22. The garment of claim 18 further comprising a tether electrically coupled to the first layer, wherein said tether shunts electricity flowing within said first layer to ground.

23. The garment of claim 18, wherein said first layer comprises yarns of carbon nanotube fibers having a high thermal conductivity and wherein said at least one additional layer of yarns thermally insulate said first layer from an adjacent environment.

24. The garment of claim 23, further comprising a tether thermally coupled to the first layer and wherein said tether shunts thermal energy between said first layer and a heat-sink or heat-source.

25. The garment of claim 18, wherein said first layer comprises tightly packed carbon nanotube fibers held together by Van der Waals' forces.

26. The garment of claim 25, wherein said first layer acts as barrier to objects larger than or equal to $1\times10^{-9}$ meters.

* * * * *